March 24, 1959    B. H. SHORT ET AL    2,879,352
CONTROL DEVICE

Filed June 18, 1956    2 Sheets-Sheet 1

INVENTORS
Brooks H. Short
Lewis R. Hetzler
BY John H. Falge

*John T. Marvin*
Their Attorney

March 24, 1959  B. H. SHORT ET AL  2,879,352
CONTROL DEVICE
Filed June 18, 1956  2 Sheets-Sheet 2
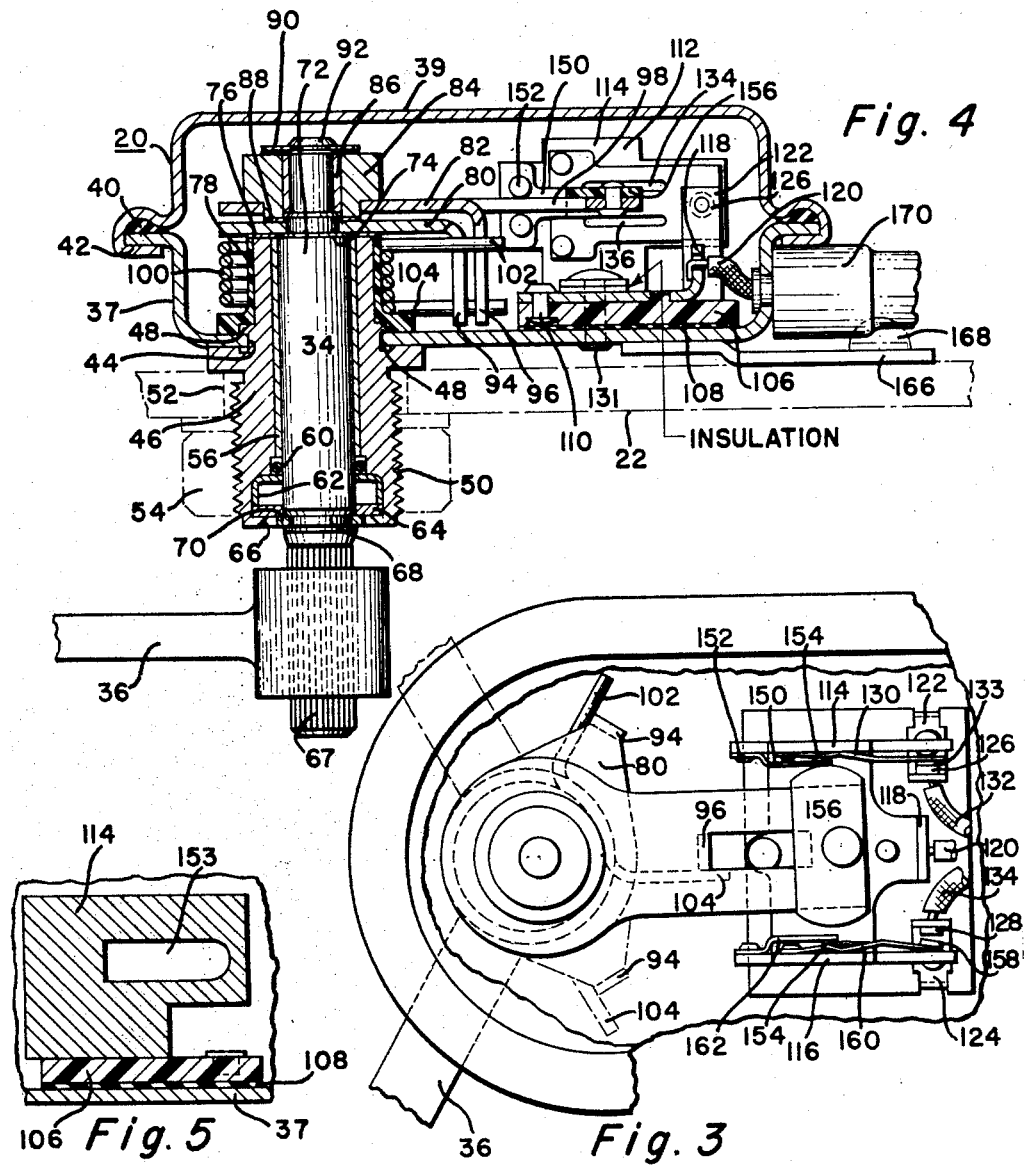
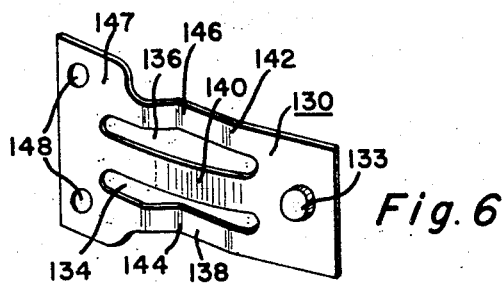
INVENTORS
Brooks H. Short
Lewis R. Hetzler
BY John H. Falge
Their Attorney United States Patent Office 2,879,352
Patented Mar. 24, 1959

2,879,352

CONTROL DEVICE

Brooks H. Short, Lewis R. Hetzler, and John H. Falge, Anderson, Ind., assignors to General Motors Corporation, Detroit, Mich., a corporation of Delaware Application June 18, 1956, Serial No. 592,155

8 Claims. (Cl. 200—85)

This invention relates to control devices and more particularly to a snap acting switch that is suitable for use as a wheel switch in a fluid suspension system for a motor vehicle.

In fluid suspension systems, a wheel switch is frequently employed to control other means, such as solenoid valves, etc., which regulate the fluid pressures in chambers which control the distance between the unsprung mass and sprung mass of the vehicle. The switch, according to the present invention, is suitable for use in such an environment and is arranged so that the switch contacts are preferably open when the sprung mass is at a proper height relative to the unsprung mass. A deviation in elevation from this height will cause either one of a pair of contacts to be moved with a snap action to a circuit closing position.

It is an object, therefore, of the present invention to provide a snap acting switch which is suitable for use as a wheel switch in a fluid suspension system for a motor vehicle.

It is a further object of the present invention to include a wheel switch in the suspension system of a motor vehicle which switch will respond to all variations in distance between the sprung and unsprung mass of the vehicle regardless of the degree of variation therebetween.

It is still a further object of the present invention to include a wheel switch in the control system for a fluid suspension system for a motor vehicle which switch will have snap acting contacts that are actuated whenever a variation in vertical distance exists between the sprung and unsprung masses of the vehicle regardless of the degree of variation in distance between the masses.

Another object of the present invention is to provide a wheel switch which has a housing that is attachable to the sprung mass of the motor vehicle and an actuating member including a rotatable shaft that is moved whenever a variation in vertical distance exists between the unsprung and sprung mass of the vehicle, which switch includes a contact actuating means that is moved whenever a variation in distance exists between the masses and which actuating means will actuate a snap acting contact set regardless of the degree of variation between the masses.

It is still another object of the present invention to provide a switch with a housing that is securable to a sprung mass of the vehicle and an actuating lever that is secured on a shaft which oscillates in response to variations of vertical distance between the sprung and unsprung mass of the vehicle and to include in the switch a pair of snap acting contact sets which are actuated by a member that is responsive to the movement of the lever but is unaffected by the degree of movement thereof.

It is still another object of the present invention to provide a switch with a housing that is securable to a sprung mass of a vehicle and an actuating lever that is secured on the shaft which oscillates in response to variations in vertical distance between the sprung and unsprung mass of the vehicle and to include in this switch a pair of snap acting contact sets which are actuated by a member that is connected through a spring to a lever so it will be responsive to the movements of the lever without regard to the degree of movement thereof.

Further objects and advantages of the present invention will be apparent from the following description, reference being had to the accompanying drawings wherein preferred embodiments of the present invention are clearly shown.

In the drawings:

Figure 1 diagrammatically shows an arrangement for mounting the switch, according to the present invention, on a vehicle that has a fluid suspension system.

Figure 3 shows the arrangement of the switch parts in Figure 2 when one set of the switch contacts are in a circuit closing position.

Figure 4 is a sectional view of the switch taken along line 4—4 in Figure 2.

Figure 5 is a sectional view taken along line 5—5 in Figure 2.

Figure 6 is a perspective view of the snap acting reed which is used to actuate the contacts of the switch.

Figure 1:
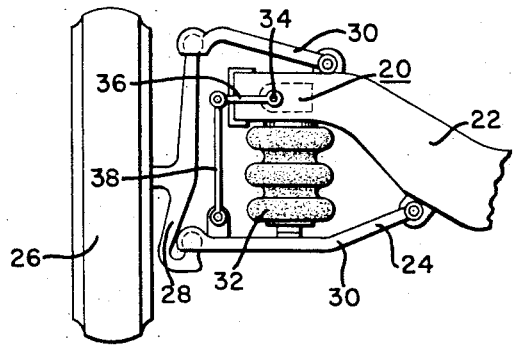

When wheel switches are employed in fluid suspension systems for motor vehicles, they are usually mounted on the sprung mass of the vehicle and operatively connected with the unsprung mass to respond to variations in the vertical distance therebetween. In the embodiment shown in Figure 1, the wheel switch 20, according to the present invention, is shown as mounted on the member 22 of the sprung mass of the vehicle upon which a portion of the unsprung mass 24 of the vehicle is secured. The unsprung mass as shown in Figure 1 includes a wheel 26, a king pin 28 and a pair of pivoted levers 30. Positioned between the bottom lever 30 and the member 22 is a compressible fluid chamber 32 which contains a suitable fluid such as air which is under pressure to maintain a predetermined distance between the member 22 and the unsprung mass of the vehicle. The switch 20 is provided with a rotatable shaft 34. This shaft is suitably connected through levers 36 and 38 with lever 30 of the unsprung mass of the vehicle.

In Figure 4 of the drawings, it will be seen that the switch 20 includes a cup-shaped housing member 37 which is arranged to provide an enclosed chamber when a cover 39 is secured thereto. In the embodiment shown, the cover 39 is sealed to the housing 37 by means of a suitable seal 40 which is compressed when the edges 42 of the cover are crimped over the extended flange on the housing 37. Extending through an opening 44 in the housing 37 is a member 46. This member is preferably secured in the opening by staking portions 48 of the member 46. The member 46 also has an externally threaded portion 50 which extends through an opening 52 in member 22. This arrangement will permit the switch housing 37 to be secured to the frame 22 when a suitable nut 54 is threaded on thread 50.

A member 46 is provided with a bearing 56 to journal the shaft 34. The exposed end of the bearing 56 is sealed to the shaft 34 by an O-ring seal 60 which is maintained in position by a cup-shaped member 62 which is held in position by a retaining washer 64. The washer 64 is held in position when portions 66 of member 46 are staked as shown.

As clearly seen in Figure 4, the shaft 34 extends external to the member 46. The extending external portion 67 of the shaft is splined to permit member 36 to be adjustably positioned thereon. This external portion 67 is also provided with a suitable groove 68 which receives a snap ring 70. The snap ring 70 bears against the retainer 64 to axially maintain the shaft 34 in position in member 46. The interior end 72 of shaft 34 is provided with a shoulder 74 which bears against a thrust washer 76. The thrust washer, in turn, rests upon the cushion 78 which is formed preferably of nylon and arranged to surround the portions of member 46 which extends within the housing 37. The cushion 78, as shown, engages the portions of housing 37 which surrounds opening 44 to prevent wear of a spring 100 which will be later described. Suitably secured to the end 72 of shaft 34 is a lever 80. This lever 80 is secured to rotate with the shaft 34 for the purposes which will be hereinafter apparent.

Rotatably carried on the extreme end of end 72 is a contact actuator assembly which includes the contact actuator lever 82, the sleeve 84 and the bushing 86. The sleeve 84 and actuator lever 82 are preferably secured together and are journaled on the end 72 by bushing 86. The entire assembly is maintained in position between washers 88 and 90 when the end 72 of shaft 34 is riveted over as at 92. The levers 80 and actuator 82 are provided with downwardly extending portions 94 and 96, respectively. The lever 82 is also provided with an extending portion 98 which extends between the snap acting contact assembly which will be hereinafter described. The coil spring 100 is arranged to loosely surround the cushion member 78. This coil spring 100 is provided with a pair of spaced extending ends 102 and 104, most clearly seen in Figures 2 and 3. These ends 102 and 104 are arranged to engage the portions 94 and 96 when the lever 36 is in a neutral position. When, however, the lever 36 is rotated in either direction from its neutral position, as, for an example, when the lever 36 is moved in a counterclockwise direction to a position shown in full lines in Figure 3, the lever 80 through portion 94 will move the end 102 of the spring 100 counterclockwise a substantial distance, i.e., up to 60°. This movement of lever 80 will be imparted through spring 100 to lever 82 so that the lever 82 also is moved counterclockwise. Lever 82, however, will only be moved a small distance and will be continuously urged by the end 104 of the spring which constantly maintains engagement with the portion 96. This arrangement will permit the contact 82 to be moved only a small distance while the lever 80 moves a substantial distance. While this arrangement will permit a considerable over-travel of the lever 80, it will, however, provide a switch which is responsive to the slightest vertical motion of the wheel 26 from a predetermined neutral position.

The contact assembly shown includes a base 106. This base is preferably formed of molded insulating material, and spaced from the housing 37 by an insulating layer 108. Secured to the base 106 by rivets 110 is a reed support 112. This reed support 112 is preferably formed of metal and has a U-shaped cross section to provide a central base portion and two up-standing walls 114 and 116. The base of the U-shaped channel member 112 is provided with upstanding lug 118 to which the lead wire 120 is attached. Also secured to the base 106 are a pair of contact supports 122 and 124. These contact supports are formed to maintain the stationary contacts 126 and 128, respectively, at a spaced distance from the walls 114 and 116. The U-shaped channel member 112, the base 106 and the insulation 108 are, of course, secured to the bottom wall of casing 37 by means of suitable rivets 131. Leads 132 and 134 are connected to the contact supports 122 and 124, respectively.

The snap acting reed 130 which causes the movable contact 133 to move into and out of engagement with the stationary contact 126 is most clearly shown in Figure 6 of the drawings. The reed 130 is formed of spring metal to have two extending spaced slots, 134 and 136. These slots divide the member 130 into three segments 138, 140 and 142. The material of the reed which forms the segment 140 is preferably stressed by compressing the metal thereof relative to the metal which forms the segments 138 and 142. The segments 138 and 142, in turn, are provided with kinked portions 144 and 146, respectively. These kinked portions 144 and 146 are arranged to engage wall 114 and provide a fulcrum when the portion 147 is secured to the wall 114 by rivets which extend through openings 148 in the reed member 130. Carried on the free end of the member 130 is the contact 133. This contact 133 is moved with a snap action into engagement with contact 126 when a contact actuator 150 is flexed as will become apparent. The actuator 150 is secured to the wall 114 by a rivet 152. The actuator 150 itself is provided with a rounded portion 154 which causes the portion 140 to be pressed toward the wall and into an opening 153 therein. When the portion 140 is pressed into the opening 153, the portion 140 will be stressed to a position so the member 130 will over center and move the contact 133 from its normally separated position relative to contact 126 to engage the contact 126 with a snap action. The contact actuator 150 has a riding head 154. An actuating lug 156 which is secured to portion 98 of the contact actuating lever 82 is sized to be out of engagement with member 154 when the lever 36 is in a neutral position. Thus, contact 133 and contact 158, which is carried by a reed 160 and actuated by an actuator 162 similar to that precedingly described, will be separated from the stationary contacts 126 and 128, respectively. The lug 156 preferably is formed of nylon and is supported on portion 98 by a metal plate, not shown.

From the above, it is manifest that when the switch 20 is correctly positioned on frame 22, by means of the adjustment which is provided by the slotted hole 164 in the bracket 166 when the screw 168 and nut 54 are tightened, and the lever 36 is in the neutral position, neither of the sets or pairs of contacts 133 and 126 and 128 and 158 will be closed. When, however, the lever 36 is moved either clockwise or counterclockwise a small amount, the lever 82 through lever 94 and spring 100 will be rotated a small degree so that lug 156 will cause either of the actuators 150 or 162 to move the stressed portions of the respective reeds 130 or 160 over the center line of the respective reed to cause the contacts to close. When, however, the lever 36 is moved beyond the range which will cause the closing of the contacts, its movement will not be imparted to the lug 156 as an over-travel arrangement is provided by means of the coil spring 100. This over-travel arrangement permits the portion 94 of lever 80 to move without effecting the contact actuating lever 82 or injuring the snap acting parts of the switch. Further, it is to be appreciated that if a switch such as shown is to be used in a vehicle suspension system, the switch will have to operate over millions of cycles during the life of the car, and, when operating, will make and break a circuit to a highly inductive load which may be in the form of solenoid coil windings. For this reason, the switch, according to the present invention, incorporates the snap acting contact movement which will insure long contact life. This contact action requires very little force to be actuated. This latter feature will assure a minimum of wear of the other parts of the switch. Another point to be noted is that the actuating pressure which is imparted by members 150 and 162 to the stressed portions of the reed 130, must be applied at the proper point on the stressed portion of the reed, regardless of the dimensional variations which normally occur in the manufacturing. These actuating members 150 and 162 by having a portion thereof stressed to provide a spherical bearing surface 154, will cause the snap action to occur with a minimum amount of friction at exactly the right position on the stressed portion of the reed.

Figure 2:
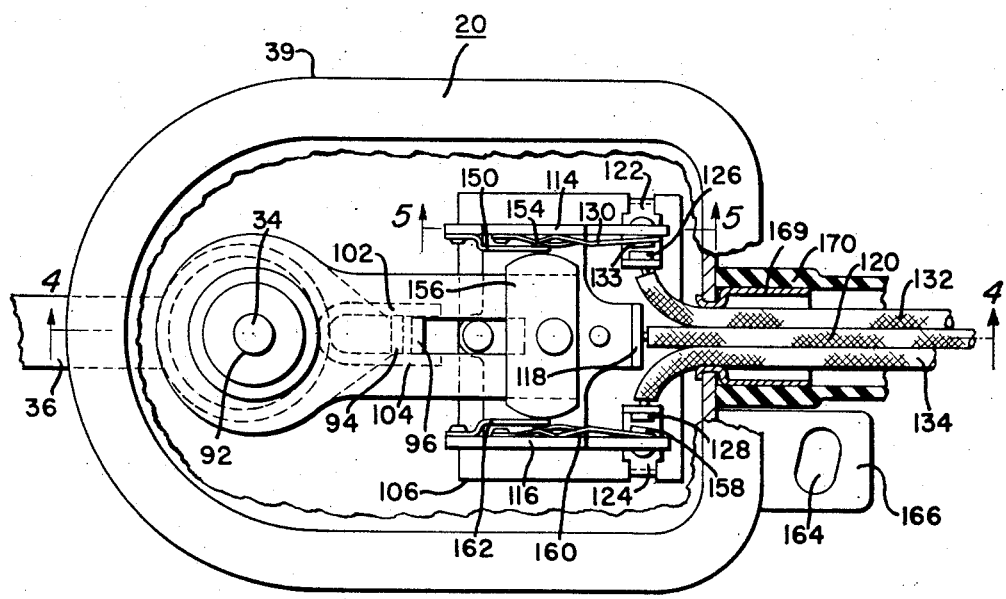
Figure 2 is a plan view of the switch, according to the present invention, with a portion of the switch cover broken away showing the arrangement of the contacts and actuating mechanism of the switch.

As seen in the drawings, the leads 132, 134 and 120 are maintained in position in an opening in the switch housing by a metal sleeve 169 which is secured to the casing 37 as shown in Figure 2. The metal sleeve 169, if desired, may have the insulating sheath 170 secured thereto which protects the wires from moisture and other elements.

While the embodiments of the present invention as herein disclosed constitute preferred forms, it is to be understood that other forms might be adopted.

What is claimed is as follows:

1. In a fluid suspension system for a motor vehicle having a sprung mass and an unsprung mass, a switch means mounted on said sprung mass and having an actuating member connected with said unsprung mass, comprising in combination; a rotatable actuating means arranged for movement in either direction of rotation from a neutral position, a pair of normally open snap acting contacts operatively connected with said actuating means and arranged to be selectively and individually closed whenever said actuator means is moved in either direction from said neutral position, and resilient means for constantly urging said actuating means to said neutral position.

2. A switch for use in a fluid suspension system of a motor vehicle having a sprung mass and an unsprung mass, comprising; a switch housing securable to said sprung mass, a rotatable member carried by said housing and operatively connected with said unsprung mass and rotatable in response to variations in distance between said masses from a neutral position, an actuating lever secured to said rotatable member, a contact actuator carried by said rotatable member, a resilient member for maintaining alignment between said actuator and lever when said lever is in a predetermined neutral position, a first pair of normally open snap acting contacts arranged to be moved to a circuit closing position by said actuator when the member is moved in one direction of rotation a predetermined distance from a neutral position, a second pair of normally open snap acting contacts arranged to be moved to a circuit closing position by said actuator when the member is moved from the neutral position a predetermined distance in the opposite direction.

3. A switch for use in a fluid suspension system for a motor vehicle having an unsprung mass and a sprung mass normally spaced in a neutral position a predetermined distance from said unsprung mass, comprising; a switch housing securable to said sprung mass, a rotatable member rotatably carried by said housing and operably connected with said unsprung mass to be rotated from a neutral position when the masses move relative to each other from the neutral position, an actuating lever secured on said member, a movable contact actuator, means including a pair of snap acting contact members spaced on opposite sides of said actuator for limiting movement of said actuator to a predetermined distance from a neutral position and a resilient means operatively connecting said lever and actuator for moving said actuator from said neutral position and for permitting said lever to move relative to said actuator after said actuator is moved said distance from the neutral position.

4. In a switch of the character described, the combination comprising; a switch housing, an actuating member freely rotatable on said housing, a lever connected to be moved when said member is rotated, a contact actuator, resilient means connecting said lever with member for transmitting movement of said member to the actuator, a pair of snap acting contacts spaced on opposite sides of said actuator and means between said contacts and said actuator for moving said contacts and limiting the movement of said actuator to a predetermined distance regardless of the relative movement between the member and lever.

5. In a system of the character described, a wheel switch having a housing secured to a sprung mass and a shaft rotatable in said switch housing operably connected with an unsprung mass of the motor vehicle wherein the wheel switch includes two spaced pairs of snap acting contacts, a rotatable contact actuator having a portion thereof disposed in the spacing between said contacts, a lever secured to said shaft for rotation therewith, and a resilient means between said lever and actuator constructed and arranged to permit the lever to move relative to said actuator and to prevent the actuator from moving relative to said lever.

6. In electric switch mechanism, the combination comprising, a support, an oscillatable shaft journalled in said support, an actuating arm fixed to said shaft to effect oscillation of the shaft, a first lever secured to said shaft for oscillation therewith, a second lever on said shaft which is freely rotatable with respect to said shaft, a first electric switch including a movable contact and a fixed contact disposed on one side of said second lever, a second electric switch including a movable contact and a fixed contact disposed on an opposite side of said second lever, said second lever including means for operating one or the other of said switches depending upon its direction of movement and having a neutral position wherein neither of said switches are operated, and resilient means operatively connecting said first and second levers for moving said second lever from said neutral position and for permitting said first lever to move relative to said second lever after said second lever is moved to operate one of said switches.

7. In electric switch mechanism, the combination comprising, a support, a shaft carried by said support and journalled for rotation with respect to said support, means for rotating said shaft, an actuating lever connected to said shaft for rotation therewith, a contact actuator carried by said shaft and freely movable with respect to said shaft, a first electric switch including a movable contact and a fixed contact disposed on one side of said contact actuator, a second electric switch including a movable contact and a fixed contact disposed on an opposite side of said second lever, said contact actuator having means for operating one or the other of said switches depending upon its direction of movement and having a neutral position wherein neither of said switches are operated, and resilient means operatively connecting said lever and actuator for moving said actuator from said neutral position and for permitting said lever to move relative to said actuator after said actuator is moved to operate one of said switches.

8. In a fluid suspension system for a motor vehicle having a sprung mass and an unsprung mass, a switch means mounted on said sprung mass and having an actuating member connected with said unsprung mass, comprising in combination; a rotatable actuating means arranged for movement in either direction of rotation from a neutral position, first and second switches each including a movable contact and a fixed contact arranged to be selectively and individually operated whenever said actuating means moves in either direction from said neutral position, and resilient means for constantly urging said actuating means to said neutral position.

References Cited in the file of this patent

UNITED STATES PATENTS

| | | |
|---|---|---|
| 1,206,953 | Wales | Dec. 5, 1916 |
| 1,289,623 | Bobroff | Dec. 31, 1918 |
| 2,442,164 | Ferris | May 25, 1948 |
| 2,548,809 | Norman | Apr. 10, 1951 |
| 2,638,997 | Kember | May 19, 1953 |
| 2,704,132 | Marco | Mar. 15, 1955 |
| 2,761,038 | Bruns et al. | Aug. 28, 1956 |